(12) United States Patent
Tripathi et al.

(10) Patent No.: US 11,636,403 B2
(45) Date of Patent: Apr. 25, 2023

(54) COMPUTER-IMPLEMENTED METHOD, SYSTEM, AND COMPUTER PROGRAM PRODUCT FOR AUTOMATED FORECASTING

(71) Applicant: Visa International Service Association, San Francisco, CA (US)

(72) Inventors: Anup Tripathi, Foster City, CA (US); Robert David Pritchard, Jr., Port Richey, FL (US); Yinle Zhou, Austin, TX (US); Suman Mukherjee, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 214 days.

(21) Appl. No.: 16/454,165

(22) Filed: Jun. 27, 2019

(65) Prior Publication Data
US 2020/0410410 A1 Dec. 31, 2020

(51) Int. Cl.
*G06Q 40/00* (2012.01)
*G06Q 10/04* (2012.01)
*G06Q 40/12* (2023.01)

(52) U.S. Cl.
CPC ............ *G06Q 10/04* (2013.01); *G06Q 40/12* (2013.12)

(58) Field of Classification Search
CPC .............................. G06Q 10/04; G06Q 40/12
See application file for complete search history.

(56) References Cited

U.S. PATENT DOCUMENTS

| 7,810,713 B2 | 10/2010 | Lal et al. | |
| 8,768,809 B1* | 7/2014 | Cole | G06Q 40/02 705/35 |
| 9,691,104 B2* | 6/2017 | Ghosh | G06Q 40/08 |
| 9,965,808 B1* | 5/2018 | Kunz | G06Q 40/12 |

(Continued)

OTHER PUBLICATIONS

Cash Flow Insight, "An innovative suite of online tools for seeing and managing your business's cash flow", https://www.pnc.com/en/small-business/banking/CashFlowInsight.html, 4 pages.

(Continued)

*Primary Examiner* — Fahd A Obeid
*Assistant Examiner* — Reva R Moore
(74) *Attorney, Agent, or Firm* — The Webb Law Firm

(57) ABSTRACT

A computer-implemented method for automated forecasting of cash flow includes: monitoring, while a plurality of first transactions are being processed in a payment network, payable transaction data associated with the plurality of first transactions, the plurality of first transactions initiated with at least one account issued to a merchant; monitoring, while a plurality of second transactions are being processed in a payment network, receivable transaction data associated with the plurality of second transactions, the plurality of second transactions between the merchant and a plurality of users; determining, based on the payable transaction data and the receivable transaction data, a plurality of seasonal variables; and generating a cash flow forecast associated with the merchant, the cash flow forecast generated based on the plurality of seasonal variables. A system and computer program product for automated forecasting of cash flow are also disclosed.

18 Claims, 10 Drawing Sheets

(56) References Cited

U.S. PATENT DOCUMENTS

| | | | | |
|---|---|---|---|---|
| 10,282,781 B2* | 5/2019 | Dunsky | | G06Q 50/16 |
| 10,402,910 B1* | 9/2019 | Kunz | | G06Q 40/12 |
| 10,489,865 B1* | 11/2019 | Dillard | | G06Q 40/12 |
| 10,552,917 B1* | 2/2020 | Kunz | | G06Q 40/12 |
| 10,990,980 B1* | 4/2021 | Reses | | G06Q 40/025 |
| 11,064,047 B1* | 7/2021 | Stegall | | G06Q 20/203 |
| 2002/0046143 A1* | 4/2002 | Eder | | G06Q 10/06 |
| | | | | 705/36 R |
| 2002/0174006 A1* | 11/2002 | Rugge | | G06Q 40/025 |
| | | | | 705/36 R |
| 2006/0047588 A1* | 3/2006 | Lal | | G06Q 40/12 |
| | | | | 705/30 |
| 2007/0016455 A1* | 1/2007 | Ryan | | G06Q 40/08 |
| | | | | 705/4 |
| 2009/0210327 A1* | 8/2009 | Meidan | | G06Q 40/12 |
| | | | | 705/30 |
| 2009/0319421 A1* | 12/2009 | Mathis | | G06Q 20/102 |
| | | | | 705/40 |
| 2010/0274630 A1* | 10/2010 | Newman | | G06Q 40/00 |
| | | | | 705/7.31 |
| 2014/0108209 A1* | 4/2014 | Lo Faro | | G06Q 40/02 |
| | | | | 705/30 |
| 2015/0081491 A1* | 3/2015 | Brereton | | G06Q 40/12 |
| | | | | 705/35 |
| 2015/0120384 A1* | 4/2015 | Gerard | | G06Q 30/0205 |
| | | | | 705/7.31 |
| 2015/0149333 A1* | 5/2015 | Yaplee | | G06Q 40/12 |
| | | | | 705/30 |
| 2015/0332295 A1* | 11/2015 | Unser | | G06Q 10/06 |
| | | | | 705/7.31 |
| 2016/0042470 A1* | 2/2016 | Shaaban | | G06Q 10/1091 |
| | | | | 705/30 |
| 2016/0086284 A1* | 3/2016 | Ghosh | | G06Q 40/08 |
| | | | | 705/4 |
| 2016/0132907 A1* | 5/2016 | DiTomasso | | G06Q 30/0202 |
| | | | | 705/7.31 |
| 2016/0350721 A1* | 12/2016 | Comerford | | H04L 67/306 |
| 2017/0053344 A1* | 2/2017 | Yaplee | | G06Q 40/12 |
| 2019/0122307 A1* | 4/2019 | Sayed | | G06Q 20/389 |
| 2020/0279198 A1* | 9/2020 | Turner | | G06Q 40/02 |

OTHER PUBLICATIONS

Cash Flow Insight, "Payable, Receivables and Accounting Software Sync", Apr. 7, 2019, 15 pages.

Huls, "The Key to Managing Profit and Cash Flow for Your Small Business and Knowing the Difference Between the Two", https://sba.thehartford.com/finance/the-key-to-managing-profit-and-cash-flow-for-your-small-business-and-knowing-the-difference-between-the-two/, Aug. 10, 2016, 9 pages.

* cited by examiner

Expenses

Expenses by Account Type and MCC

57K
Total Expense

| | SPEC CONTRACT... | HOME SUPPLY W... | HARDWARE STOR... | WHOLESALE CLUBS... | GROCERY STORE... | SERVICE STATIONS... | AUTOMATED FUE... | MISC AUTO DEAL... | RETAURANTS... | DRUG STORES &... | INSURANCE SALE... | AUTO SERVICE SH... | CAR WASHES... |
|---|---|---|---|---|---|---|---|---|---|---|---|---|---|
| ....8762 (Cash Account) | $46,830.00 | $516.01 | $101.28 | $238.71 | $421.34 | $294.43 | $0 | $307.15 | $348.38 | $83.58 | $0 | $0 | $12.00 |
| ....2404 (Credit Account) | $0 | $221.62 | $125.34 | $602.82 | $0 | $2313.05 | $42.78 | $581.52 | $710.15 | $207.23 | $0 | $37.13 | $0 |
| ....2211 (Credit Account) | $0 | $0 | $0 | $0 | $195.67 | $809.71 | $0 | $333.43 | $183.71 | $41.01 | $82.64 | $0 | $0 |

Client Name

FIG. 3A

Daily Expenses

2016

| JANUARY | FEBRUARY | MARCH |
|---|---|---|
|                1 [2]<br>3  4  5 [6] 7  8  9<br>10 11 12 13 14 [15] 16<br>17 18 19 20 21 22 23<br>24 25 26 27 28 29 30<br>[31] |   1 [2] 3  4  5  6<br>7  8  9 10 11 12 13<br>14 [15] 16 17 [18] 19 20<br>21 [22] 23 [24] 25 26 27<br>28 [29] |      1  2  3  4  5<br>6  7  8  9 10 11 12<br>13 14 [15][16] 17 18 [19]<br>20 [21] 22 23 24 25 [26]<br>27 [28] 29 30 [31] |

| APRIL | MAY | JUNE |
|---|---|---|
|               1  2<br>3  4 [5] 6 [7] 8 [9]<br>10 11 12 13 14 15 16<br>17 [18] 19 20 [21] 22 23<br>24 25 [26] 27 28 29 30 | 1  2  3 [4] 5 [6] 7<br>8  9 10 11 12 13 14<br>[15] 16 17 [18] 19 20 21<br>22 [23][24] 25 [26] 27 28<br>29 30 31 |         1  2  3  4<br>[5] 6  7  8  9 [10][11]<br>12 13 [14] 15 [16] 17 [18]<br>19 20 21 22 [23][24] 25<br>26 27 28 29 30 |

| JULY | AUGUST | SEPTEMBER |
|---|---|---|
|              [1] 2<br>3  4  5 [6] 7 [8] 9<br>10 [11] 12 [13] 14 15 16<br>17 18 19 [20] 21 [22] 23<br>24 25 26 27 28 29 30<br>31 |  1  2  3  4  5  6<br>7  8  9 10 11 12 13<br>14 15 16 17 18 19 20<br>21 22 23 24 25 26 27<br>28 29 30 31 |            1  2  3<br>4  5  6  7  8  9 [10]<br>11 [12] 13 14 15 16 [17]<br>18 19 20 21 22 23 24<br>25 26 27 28 29 30 |

| OCTOBER | NOVEMBER | DECEMBER |
|---|---|---|
|                [1]<br>[2] 3 [4] 5  6 [7] 8<br>9 10 11 [12] 13 [14] 15<br>16 17 18 19 [20][21] 22<br>[23] 24 25 [26][27] 28 29<br>30 31 |   1 [2] 3  4  5<br>6  7 [8][9] 10 11 12<br>13 14 15 16 17 [18] 19<br>[20] 21 [22] 23 24 25 26<br>[27] 28 29 [30] |          [1] 2  3<br>[4] 5 [6] 7  8 [9][10]<br>11 12 13 [14] 15 [16] 17<br>18 19 20 21 22 23 [24]<br>[25][26] 27 [28][29] 30 31 |

Client Name

FIG. 3B

COMPUTER-IMPLEMENTED METHOD, SYSTEM, AND COMPUTER PROGRAM PRODUCT FOR AUTOMATED FORECASTING

BACKGROUND

1. Field

The disclosure relates to computer-implemented forecasting and, in some non-limiting embodiments or aspects, to a computer-implemented method, system, and computer program product for automated forecasting of cash flow.

2. Technical Considerations

Business-to-business (B2B) payment transaction management is complex because the business must manage both payable and receivable ends of transactions. Difficulty with this complex cash flow management is a common reason small and medium-sized businesses (SMBs) fail, as it is reported that 82% of SMBs fail because of cash flow mismanagement, based on a U.S. Bank study[1].

[1] https://sba.thehartford.com/finance/the-key-to-managing-profit-and-cash-flow-for-your-small-business-and-knowing-the-difference-between-the-two/

Both lack of accessible resources and limitations of the existing solutions contribute to SMB cash flow mismanagement. This is at least in part because the existing systems lack the operating efficiencies to allow the business to forecast cash flow in near real-time based on the most useful data for making such forecasts.

SUMMARY

Accordingly, and generally, provided is an improved computer-implemented method, system, and computer program product for automated forecasting of cash flow.

According to some non-limiting embodiments or aspects a computer-implemented method for automated forecasting of cash flow, includes: monitoring, with at least one processor while a plurality of first transactions are being processed in a payment network, payable transaction data associated with the plurality of first transactions, the plurality of first transactions initiated with at least one account issued to a merchant; monitoring, with at least one processor while a plurality of second transactions are being processed in a payment network, receivable transaction data associated with the plurality of second transactions, the plurality of second transactions between the merchant and a plurality of users; determining, with at least one processor and based on the payable transaction data and the receivable transaction data, a plurality of seasonal variables; and generating, with at least one processor, a cash flow forecast associated with the merchant, the cash flow forecast generated based on the plurality of seasonal variables.

In some non-limiting embodiments or aspects, the method may further include receiving, with at least one processor, firmographics data associated with the merchant, where the cash flow forecast may be generated based on the firmographics data. Data associated with the plurality of seasonal variables may be grouped into monthly sets. The method may further include determining, with at least one processor and based on the payable transaction data and the receivable transaction data, a plurality of non-seasonal variables, where the cash flow forecast may be generated based on the non-seasonal variables. The cash flow forecast may include a cash flow forecast for at least a subsequent four months. The cash flow forecast may be generated based on at least one of an exponential smoothing model and an autoregressive integrated moving average model. The cash flow forecast may be generated in near real-time relative to the plurality of first transactions and the plurality of second transactions.

According to some non-limiting embodiments or aspects, a system for automated forecasting of cash flow includes at least one processor programmed or configured to: monitor, while a plurality of first transactions are being processed in a payment network, payable transaction data associated with the plurality of first transactions, the plurality of first transactions initiated with at least one account issued to a merchant; monitor, while a plurality of second transactions are being processed in a payment network, receivable transaction data associated with the plurality of second transactions, the plurality of second transactions between the merchant and a plurality of users; determine, based on the payable transaction data and the receivable transaction data, a plurality of seasonal variables; and generate a cash flow forecast associated with the merchant, the cash flow forecast generated based on the plurality of seasonal variables.

In some non-limiting embodiments or aspects, the at least one processor may be further programmed or configured to receive firmographics data associated with the merchant, where the cash flow forecast may be generated based on the firmographics data. Data associated with the plurality of seasonal variables may be grouped into monthly sets. The at least one processor may be further programmed or configured to determine, based on the payable transaction data and the receivable transaction data, a plurality of non-seasonal variables, where the cash flow forecast may be generated based on the non-seasonal variables. The cash flow forecast may include a cash flow forecast for at least a subsequent four months. The cash flow forecast may be generated based on at least one of an exponential smoothing model and an autoregressive integrated moving average model. The cash flow forecast may be generated in near real-time relative to the plurality of first transactions and the plurality of second transactions.

According to some non-limiting embodiments or aspects, a computer program product for automated forecasting of cash flow includes at least one non-transitory computer-readable medium including one or more instructions that, when executed by at least one processor, cause the at least one processor to: monitor, while a plurality of first transactions are being processed in a payment network, payable transaction data associated with the plurality of first transactions, the plurality of first transactions initiated with at least one account issued to a merchant; monitor, while a plurality of second transactions are being processed in a payment network, receivable transaction data associated with the plurality of second transactions, the plurality of second transactions between the merchant and a plurality of users; determine, based on the payable transaction data and the receivable transaction data, a plurality of seasonal variables; and generate a cash flow forecast associated with the merchant, the cash flow forecast generated based on the plurality of seasonal variables.

In some non-limiting embodiments or aspects, the one or more instructions may cause the at least one processor to receive firmographics data associated with the merchant, where the cash flow forecast may be generated based on the firmographics data. Data associated with the plurality of seasonal variables may be grouped into monthly sets. The one or more instructions may cause the at least one processor to determine, based on the payable transaction data and the receivable transaction data, a plurality of non-seasonal variables, where the cash flow forecast may be generated based on the non-seasonal variables. The cash flow forecast may include a cash flow forecast for at least a subsequent four months. The cash flow forecast may be generated based on at least one of an exponential smoothing model and an autoregressive integrated moving average model. The cash flow forecast may be generated in near real-time relative to the plurality of first transactions and the plurality of second transactions.

Further embodiments or aspects are set forth in the following numbered clauses:

Clause 1: A computer-implemented method for automated forecasting of cash flow, comprising: monitoring, with at least one processor while a plurality of first transactions are being processed in a payment network, payable transaction data associated with the plurality of first transactions, the plurality of first transactions initiated with at least one account issued to a merchant; monitoring, with at least one processor while a plurality of second transactions are being processed in a payment network, receivable transaction data associated with the plurality of second transactions, the plurality of second transactions between the merchant and a plurality of users; determining, with at least one processor and based on the payable transaction data and the receivable transaction data, a plurality of seasonal variables; and generating, with at least one processor, a cash flow forecast associated with the merchant, the cash flow forecast generated based on the plurality of seasonal variables.

Clause 2: The computer-implemented method of clause 1, further comprising receiving, with at least one processor, firmographics data associated with the merchant, wherein the cash flow forecast is generated based on the firmographics data.

Clause 3: The computer-implemented method of clause 1 or 2, wherein data associated with the plurality of seasonal variables is grouped into monthly sets.

Clause 4: The computer-implemented method of any of clauses 1-3, further comprising determining, with at least one processor and based on the payable transaction data and the receivable transaction data, a plurality of non-seasonal variables, wherein the cash flow forecast is generated based on the non-seasonal variables.

Clause 5: The computer-implemented method of any of clauses 1-4, wherein the cash flow forecast comprises a cash flow forecast for at least a subsequent four months.

Clause 6: The computer-implemented method of any of clauses 1-5, wherein the cash flow forecast is generated based on at least one of an exponential smoothing model and an autoregressive integrated moving average model.

Clause 7: The computer-implemented method of any of clauses 1-6, wherein the cash flow forecast is generated in near real-time relative to the plurality of first transactions and the plurality of second transactions.

Clause 8: A system for automated forecasting of cash flow, comprising at least one processor programmed or configured to: monitor, while a plurality of first transactions are being processed in a payment network, payable transaction data associated with the plurality of first transactions, the plurality of first transactions initiated with at least one account issued to a merchant; monitor, while a plurality of second transactions are being processed in a payment network, receivable transaction data associated with the plurality of second transactions, the plurality of second transactions between the merchant and a plurality of users; determine, based on the payable transaction data and the receivable transaction data, a plurality of seasonal variables; and generate a cash flow forecast associated with the merchant, the cash flow forecast generated based on the plurality of seasonal variables.

Clause 9: The system of clause 8, wherein the at least one processor is further programmed or configured to receive firmographics data associated with the merchant, wherein the cash flow forecast is generated based on the firmographics data.

Clause 10: The system of clause 8 or 9, wherein data associated with the plurality of seasonal variables is grouped into monthly sets.

Clause 11: The system of any of clauses 8-10, wherein the at least one processor is further programmed or configured to determine, based on the payable transaction data and the receivable transaction data, a plurality of non-seasonal variables, wherein the cash flow forecast is generated based on the non-seasonal variables.

Clause 12: The system of any of clauses 8-11, wherein the cash flow forecast comprises a cash flow forecast for at least a subsequent four months.

Clause 13: The system of any of clauses 8-12, wherein the cash flow forecast is generated based on at least one of an exponential smoothing model and an autoregressive integrated moving average model.

Clause 14: The system of any of clauses 8-13, wherein the cash flow forecast is generated in near real-time relative to the plurality of first transactions and the plurality of second transactions.

Clause 15: A computer program product for automated forecasting of cash flow, the computer program product comprising at least one non-transitory computer-readable medium including one or more instructions that, when executed by at least one processor, cause the at least one processor to: monitor, while a plurality of first transactions are being processed in a payment network, payable transaction data associated with the plurality of first transactions, the plurality of first transactions initiated with at least one account issued to a merchant; monitor, while a plurality of second transactions are being processed in a payment network, receivable transaction data associated with the plurality of second transactions, the plurality of second transactions between the merchant and a plurality of users; determine, based on the payable transaction data and the receivable transaction data, a plurality of seasonal variables; and generate a cash flow forecast associated with the merchant, the cash flow forecast generated based on the plurality of seasonal variables.

Clause 16: The computer program product of clause 15, wherein the one or more instructions cause the at least one processor to receive firmographics data associated with the merchant, wherein the cash flow forecast is generated based on the firmographics data.

Clause 17: The computer program product of clause 15 or 16, wherein data associated with the plurality of seasonal variables is grouped into monthly sets.

Clause 18: The computer program product of any of clauses 15-17, wherein the one or more instructions cause the at least one processor to determine, based on the payable transaction data and the receivable transaction data, a plurality of non-seasonal variables, wherein the cash flow forecast is generated based on the non-seasonal variables.

Clause 19: The computer program product of any of clauses 15-18, wherein the cash flow forecast comprises a cash flow forecast for at least a subsequent four months.

Clause 20: The computer program product of any of clauses 15-19, wherein the cash flow forecast is generated based on at least one of an exponential smoothing model and an autoregressive integrated moving average model.

Clause 21: The computer program product of any of clauses 15-20, wherein the cash flow forecast is generated in near real-time relative to the plurality of first transactions and the plurality of second transactions.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise. Further, the phrase "based on" is intended to mean "based at least partially on" unless explicitly stated otherwise.

BRIEF DESCRIPTION OF THE DRAWINGS

Additional advantages and details of the disclosure are explained in greater detail below with reference to the non-limiting embodiments that are illustrated in the accompanying schematic figures, in which:

FIGS. 3A-3C show some non-limiting embodiments or aspects of expense reports generated by a forecast generator;

DETAILED DESCRIPTION

Figure 1:
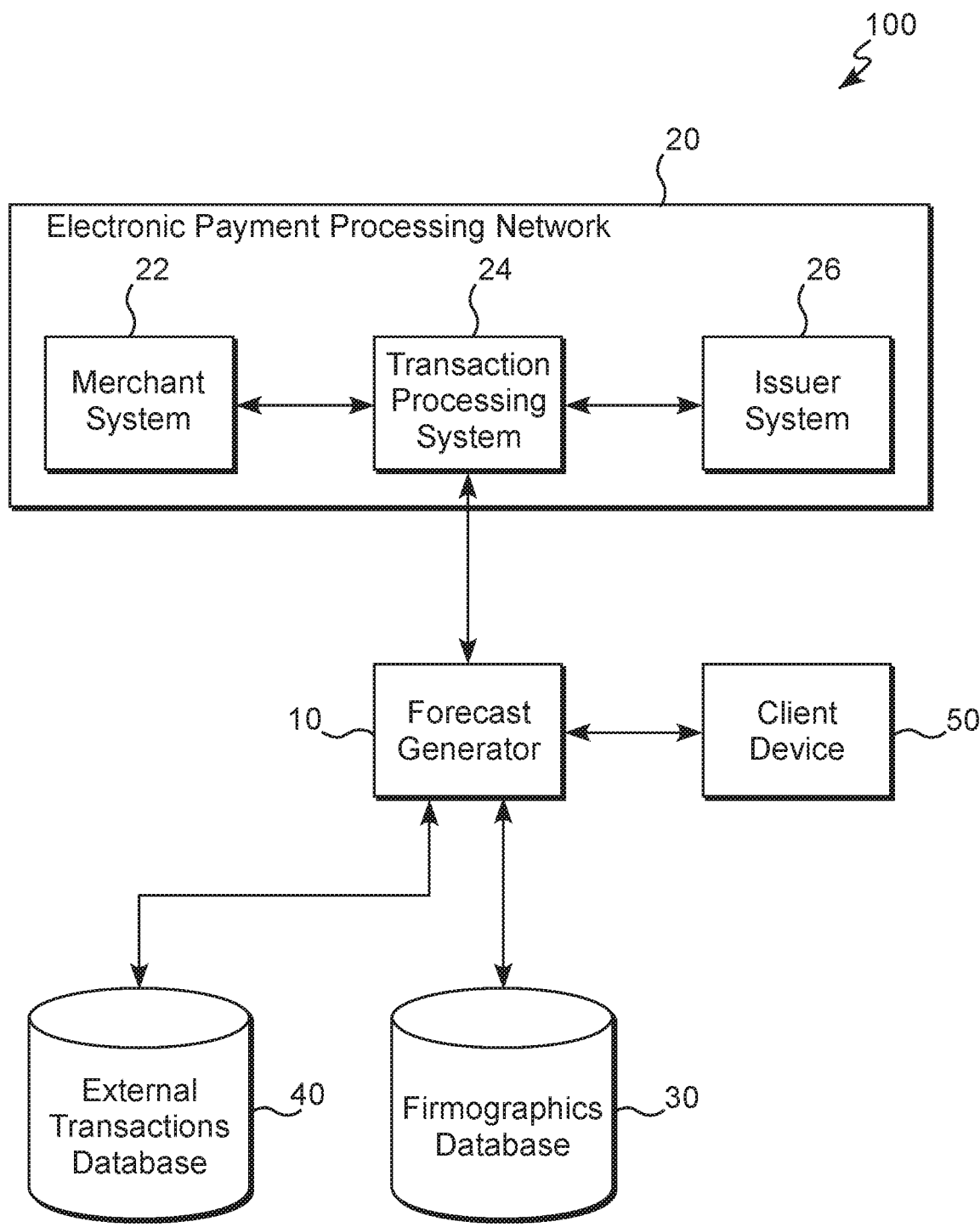
FIG. 1 shows a schematic view of a system for automated forecasting of cash flow according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

As used herein, the term "account identifier" may refer to one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the term "client" may refer to a merchant for whom a cash flow forecast is generated. The client may engage in payment transactions. In some payment transactions, the client may be a merchant engaging in the payment transaction, as a consumer, with another merchant to purchase goods and/or services from that merchant (e.g., FIG. 2A). In certain payment transactions, the client may be a merchant engaging in payment transactions as a merchant with consumers, to whom the client provides goods and/or services (e.g., FIG. 2B).

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. It will be appreciated that numerous other arrangements are possible.

As used herein, the term "computing device" may refer to one or more electronic devices for processing data. The computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may be a non-mobile device, such as a desktop computer. Furthermore, a "computer" or "computing device" may include components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side frontend and/or server-side back-end for receiving data from the client. An "interface" refers to a generated display, such as one or more graphical user interfaces (GUIs) with which a user may interact, either directly or indirectly (e.g., through a keyboard, mouse, etc.).

As used herein, the terms "issuer institution," "payment device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "merchant" may refer to an individual or entity that provides goods and/or services, or access to goods and/or services, to consumers based on a transaction, such as a payment transaction. As used herein, the terms "merchant" or "merchant system" may refer to one or more computer systems operated by or on behalf of a merchant, such as a server computer executing one or more software applications. As used herein, the term "point-of-sale (POS) system" may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "server" may refer to or include one or more computing devices operated by or that facilitate communication and processing for multiple parties in a network environment, such as the Internet, although it will be appreciated that communication may be facilitated over one or more public or private network environments and that various other arrangements are possible. Further, multiple computers, e.g., servers or other computing devices such as point-of-sale (POS) devices, communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

Non-limiting embodiments or aspects of the present disclosure are directed to a computer-implemented method, system, and computer program product for automated forecasting of cash flow. Non-limiting embodiments or aspects provide a unique arrangement in which the electronic payment processing network communicates with a forecast generator in order to generate a more accurate and near real-time cash flow forecast for the merchant. The electronic payment processing network captures both payments made by the merchant as a consumer and payments received by the merchant as a merchant. This arrangement between the electronic payment processing network with the forecast generator leads to increased efficiencies in generating cash flow forecasts by utilizing centralized data from the electronic payment processing network as an input to the cash flow forecast. Moreover, non-limiting embodiments or aspects utilize seasonal variables, which allow for the forecasted cash flow to be more accurately projected based on the seasonal variables. Non-limiting embodiments or aspects provide SMBs with an automated system for tracking complex B2B payment transactions and generating near real-time updated cash flow forecasts.

Referring to FIG. 1, a system 100 for automated forecasting of cash flow according to some non-limiting embodiments or aspects is shown. The system 100 may include a forecast generator 10 for generating a cash flow forecast of a merchant (e.g., client) operating client device 50 in near real-time. The forecast generator 10 may include a computing device and/or software executing on a computing device, such as an application executed by a server computer. The forecast generator 10 may be in communication with an electronic payment processing network 20 for processing payment transactions, a firmographics database 30, an external transactions database 40, and/or a client device 50 (each described in more detail hereinafter). The forecast generator 10 may generate the cash flow forecast for the merchant based on data received from the electronic payment processing network 20, the firmographics database 30, and the external transactions database 40.

With continued reference to FIG. 1, the electronic payment processing network 20 may include a merchant system 22 operated by or on behalf of a merchant engaging in a payment transaction with a consumer. The merchant system 22 may be in communication with a transaction processing system 24 operated by or on behalf of a transaction service provider associated with a payment device issued to the consumer of the payment transaction. The transaction processing system 24 may be in communication with an issuer system 26 operated by or on behalf of an issuer which issued the payment device used in the payment transaction to the consumer. Processing payment transactions by the electronic payment processing network 20 may include the consumer initiating a payment transaction with the merchant system 22 using a payment device, such as for goods and/or services offered by the merchant. The merchant system 22 may communicate a transaction message to the transaction processing system 24 to request processing of the payment transaction (e.g., authorization, clearing, settlement, and/or the like). The transaction message may include data used to process the payment transaction, such as account identifier associated with the payment device (e.g., PAN), consumer information, transaction amount, merchant information, goods and/or services information and the like.

In response to receiving the transaction message, the transaction processing system 24 may generate an authorization request including at least a portion of the data from the transaction message, and communicate the authorization request to the issuer system 26 to request that the issuer system 26 make an authorization determination associated with the payment transaction. The issuer system 26 may communicate an authorization response to the transaction processing system 24 that includes the authorization determination, such as to approve or decline the payment transaction. The transaction processing system 24 may communicate the authorization determination to the merchant system in a transaction message response.

Figure 2A:
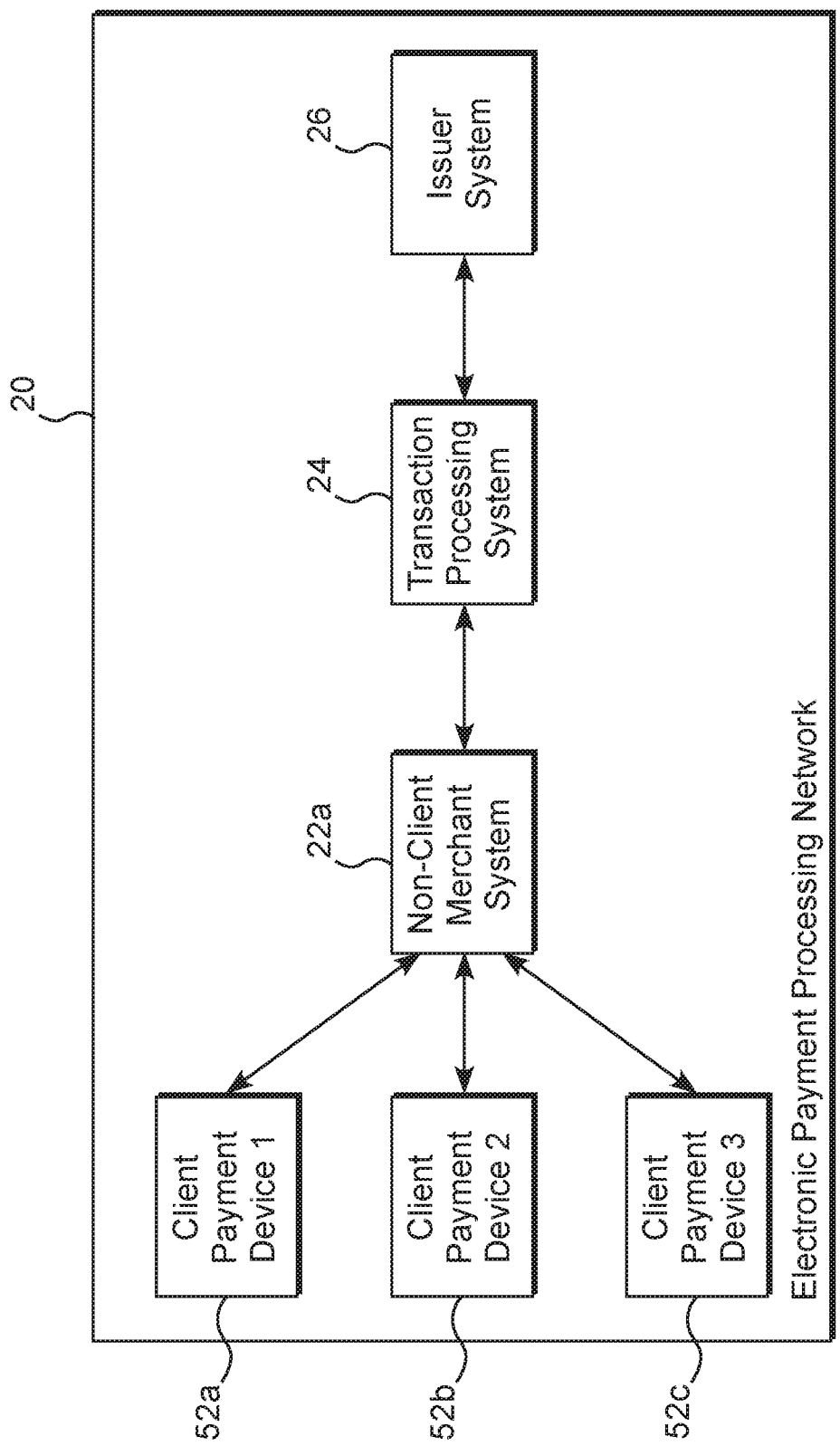
FIG. 2A shows a schematic view of an electronic payment processing network for processing a plurality of first transactions according to some non-limiting embodiments or aspects.
Figure 2B:
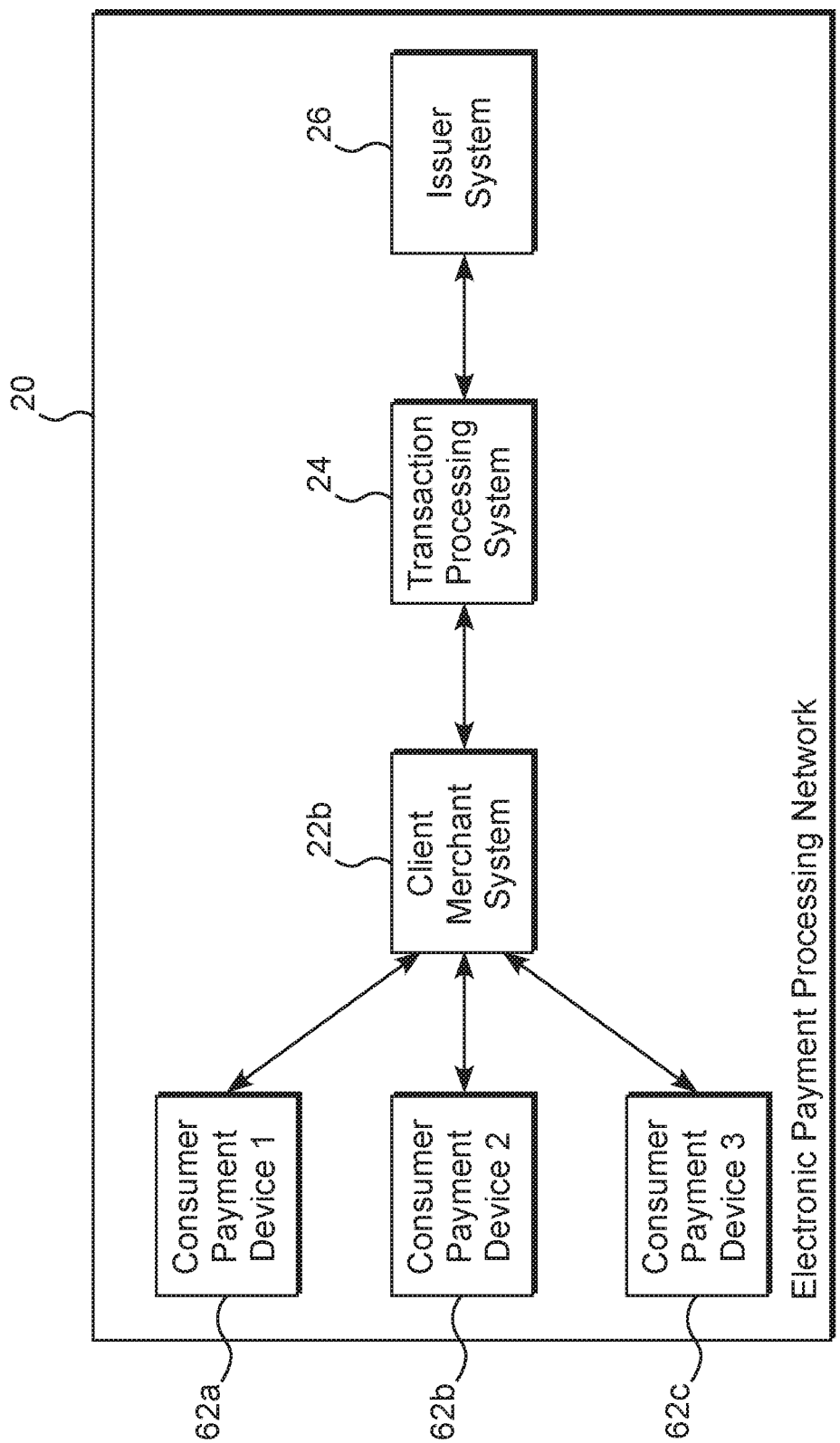
FIG. 2B shows a schematic view of an electronic payment processing network for processing a plurality of second transactions according to some non-limiting embodiments or aspects.

Referring to FIGS. 2A-2B, non-limiting embodiments or aspects of the electronic payment processing network 20 are shown in which the merchant for which the cash flow forecast is generated (the client) is the consumer in a payment transaction (FIG. 2A) or the merchant in a payment transaction (FIG. 2B).

Referring to FIG. 2A, the merchant for which the cash flow forecast is generated may have at least one client payment device 52a-52c (and corresponding account) issued thereto by an issuer. Non-limiting examples of these client payment devices 52a-52c include corporate credit or debit cards issued to employees of the client to be used for business expenses. The client payment devices 52a-52c may be used to initiate transactions with a non-client merchant system 22a, which has the features of the merchant system 22 from FIG. 1 and is operated by or on behalf of a merchant different from the client. These payment transactions between the client and the non-client merchant may be further processed as described in connection with FIG. 1. It will be appreciated that these payment transactions in FIG. 2A constitute expenses associated with the client.

Referring to FIG. 2B, the client may engage in payment transactions with its consumers. The consumers may hold consumer payment devices 62a-62c (and corresponding accounts) issued by an issuer. Non-limiting examples of these consumer payment devices 62a-62c include credit or debit cards issued to individuals or businesses wishing to purchase goods or services of the client. The consumer payment devices 62a-62c may be used to initiate transactions with a client merchant system 22b, which has the features of the merchant system 22 from FIG. 1 and is operated by or on behalf of the client. These payment transactions between consumers and the client (functioning as a merchant in the payment transaction) may be further processed as described in connection with FIG. 1. It will be appreciated that these payment transactions in FIG. 2B constitute revenue associated with the client.

Referring back to FIG. 1, the forecast generator 10 may communicate with the electronic payment processing network 20 to monitor payable transaction data, including data associated with the payment transactions in which the client is the consumer (from FIG. 2A), to determine expenses associated with the client. The payable transaction data may be monitored while the payment transaction is being processed in the electronic payment processing network 20. The payable transaction data may include at least one of the following for each processed transaction: transaction date, transaction amount, merchant information (e.g., merchant identifier), merchant category code, payment device used, goods or services purchased, and/or the like.

With continued reference to FIG. 1, the forecast generator 10 may communicate with the electronic payment processing network 20 to monitor receivable transaction data, including data associated with the payment transactions in which the client is the merchant (from FIG. 2B) to determine revenue associated with the client. The receivable transaction data may be monitored while the payment transaction is being processed in the electronic payment processing network 20. The receivable transaction data may include at least one of the following for each processed transaction: transaction date, transaction amount, consumer information, merchant category code, payment device used, goods or services purchased, and/or the like.

With continued reference to FIG. 1, the forecast generator 10 may communicate with the firmographics database 30 to receive (e.g., passively receive, actively retrieve, etc.) firmographics data associated with the client. The firmographics database may be operated by or on behalf of the transaction service provider, the issuer, or some other third party entity. The firmographics data may include descriptive attributes associated with the client (e.g., demographics data for organizations). Firmographics data may include data associated with the industry of the client (e.g., business with which the client is associated as defined by an identifier, such as a NAICS or SIC code), location data (e.g., geographic region in which the business is located or engages in transactions), size of the business (e.g., number of employees), duration of the business (e.g., year the business started), status or structure of the organization (e.g., type of entity, such as a subsidiary, sole proprietorship, limited liability corporation, and the like), performance of the client (e.g, rate of growth/decline, historical profits and losses, duration of client's existence, and the like). The firmographic data may also include data generated or derived from analysis of the above-listed data. The firmographic database 30 may include a database operated by or on behalf of a data or analytics product or service (e.g., Dun & Bradstreet® or the like).

With continued reference to FIG. 1, the forecast generator 10 may communicate with the external transactions database 40 to receive external transaction data associated with payment transactions corresponding to the client but processed outside of the electronic payment processing network 20. Such transactions may include cash transactions, automated clearing house (ACH) transactions, and/or the like. The external transactions database 40 may include one or multiple databases depending on where data associated with the external transactions are stored. The external transactions database 40 may include a database operated by or on behalf of a transaction management or accounting product or service (e.g., Fraedom®, QuickBooks®, and/or the like).

With continued reference to FIG. 1, the forecast generator 10 may determine seasonal variables (and non-seasonal variables) from the received payable transaction data, receivable transaction data, firmographics data, and external transaction data. As used herein, a "seasonal variable" refers to an attribute having a value which varies according to an interval, such as weekly, monthly, quarterly, a predetermined number of days, and/or the like. The seasonal data may be grouped into sets of data based on the specific regular interval, such as weekly sets, monthly sets, quarterly sets, and the like. The variable may be made seasonal by one or more factors, such as weather, holidays, regularly scheduled events, and the like. A variable may be determined to be seasonal using any of a number of statistical analyses, such as run sequence plots, seasonal plots, seasonal subseries plots, box plots, and/or autocorrelation plots.

With continued reference to FIG. 1, the forecast generator 10 may determine past cash flows associated with the client and may generate a cash flow forecast including a projected future cash flow for the client. The past cash flow and cash flow forecast may be determined using the data received from the electronic payment processing network 20, the firmographics database 30, and/or the external transactions database 40, and may also weigh the determined seasonal and non-seasonal variables to generate a more accurate cash flow forecast.

The past cash flows for the client may be determined according to the following cash balance equation: Cash Balance=Revenue−Expense The expense calculation may include payment transactions processed by the electronic payment processing network 20 for which the client was the consumer (e.g., FIG. 2A) and/or expenses from other external transactions from the external transactions database 40 or other sources. These expenses may be aggregated to determine a total expenses for the client. The expense calculation may include the payment transactions of the client over any time period, such as over the past 10 years, past 5 years, past 2 years, past 1 year, past 6 months, past quarter, past month, past week, past day, since the inception of the client, and/or the like.

The revenue calculation may include payment transactions processed by the electronic payment processing network 20 for which the client was the merchant (e.g., FIG. 2B) and/or revenue from other external transactions from the external transactions database 40 or other sources. These revenues may be aggregated to determine a total revenue for the client. The revenue calculation may include the payment transactions of the client over any time period, such as over the past 10 years, past 5 years, past 2 years, past 1 year, past 6 months, past quarter, past month, past week, past day, since the inception of the client, and/or the like.

The expense calculation and the revenue calculation may be used to determine the past cash flow for any desired time period.

With continued reference to FIG. 1, the forecast generator 10 may generate a cash flow forecast based on any of the above-referenced data and variables. The forecast generator 10 may generate a cash flow forecast for the client for any future time period, such as the next week, next month, next 2 months, next quarter, next 4 months, next 5 months, next 6 months, next year, and/or the like. The cash flow forecast may be generated by the forecast generator 10 in near real-time relative to the payment transactions of the client, such that the cash flow forecast is generated or updated within seconds or minutes of a payment transaction of the client being processed. The cash flow forecast may be automatically generated or updated by the forecast generator 10 in response to a new payment transaction of the client being processed. The cash flow forecast may be automatically generated or updated by the cash flow forecast in response to receiving a forecast request from the client device 50. The client device 50 may be a computing device of the client, such as a smartphone, tablet computer, laptop computer, desktop computer, and the like.

The cash flow forecast may be generated by the forecast generator 10 using a variety of different algorithms. In some non-limiting embodiments or aspects, the forecast generator 10 may generate the cash flow forecast using an autoregressive integrated moving average (ARIMA) model, such as a seasonal autoregressive integrated moving average (SA-RIMA or Seasonal ARIMA) model. The seasonal ARIMA model may be represented by the following:

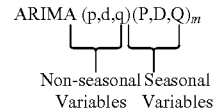

In the above representation, p, d, and q are the relevant non-seasonal variables, and P, D, and Q are the relevant seasonal variables. In the above representation, m represents the number of time periods before the seasonal pattern repeats again (e.g., 12 for monthly data, 4 for quarterly data, and the like).

The seasonal aspect of the model may include variables that are similar to the non-seasonal variables of the model, but involve backshifts of the seasonal period. Prior to fitting the seasonal ARIMA model for each time series, a stationarity check may be performed using an Augmented Dickey-Fuller test or other method of testing a time series sample. Depending on the stationarity of the time series in its non-seasonal and seasonal variables, the model coefficients (e.g., d, D) may be tuned as necessary. A grid search approach may be executed on each time series to tune the model coefficients (e.g., p, q, P, Q). Coefficients p and P may be the lag order (e.g., number of lag observations included in the model). Coefficients d and D may be the degree of differencing (e.g., the number of times that the raw observations are differenced). Coefficients q and Q may be the order of moving average (e.g., the size of the moving average window). Coefficients d and D may be non-zero if the time series is non-stationary, which may be determined using an Augmented Dickey-Fuller test. Depending on the results of the stationary test, d or D can be set to an appropriate non-zero value (e.g., 1, 2, 3, and the like). To tune coefficients p, P, q, or Q hypothesis testing may not be performed such that the coefficient combination which generates the best fit model may be used.

In some non-limiting embodiments or aspects, the forecast generator 10 may generate the cash flow forecast using an exponential smoothing model, such as a Holt-Winter Additive Model. The Holt-Winter Additive Model model may be represented by the following algorithm:

$$y_{t+h|t}=l_t+hb_t+s_{t+h}+m(k+1)$$

In the above algorithm:

$$l_t=\alpha(y_t-s_{t-m})+(1-\alpha)(l_{t-1}+b_{t-1})$$

$$b_t=\beta^*(l_t-l_{t-1})+(1-\beta^*)b_{t-1}$$

$$s_t=\gamma(y_t-l_{t-1}-b_{t-1})+(1-\gamma)x_{t-m}$$

In the above algorithms, $l_t$ represents a level smoothing equation, $b_t$ represents a trend smoothing equation, and $s_t$ represents a smoothing equation for seasonal variables, with smoothing parameters $\alpha$, $\beta^*$, $\gamma$. In the above algorithms t represents time, m represents the number of time periods before the seasonal pattern repeats again (e.g., 12 for monthly data, 4 for quarterly data, and the like), and k is the integer part of (h−1)/m. In the above algorithm, h represents a forecast horizon (e.g., a length of time into the future for which the forecast is to be prepared). The level (or mean) smoothing equation shows a weighted average between the seasonally adjusted observation and the non-seasonal forecast for time t. The trend smoothing equation includes the trend equation in Holt's linear method. The seasonal smoothing equation shows a weighted average between the current seasonal index and the seasonal index of the same season during the previous repeating period. Model coefficients for the Holt-Winters model may be estimated using a maximum likelihood estimation.

In some non-limiting embodiments or aspects, the forecast generator 10 may generate the cash flow forecast using a blended model that collects the average value from each of the forecast models used (e.g., the Seasonal ARIMA Model and Holt-Winter Additive Model) to generate the cash flow forecast. For subsequent years, the forecasted values may be compared against actual values to weigh each model used in the blended model accordingly, thereby improving subsequent performance of the blended model.

With continued reference to FIG. 1, the forecast generator 10 may communicate the past cash flow and/or the cash flow forecast to the client device 50. Based on the past cash flow and/or the cash flow forecast received by the client device 50, the client device 50 may initiate an automated action based on the data contained therein. For example, the client device 50 may initiate a communication of a loan request for a loan; initiate a communication for a payment device limit increase associated with a payment device issued to the client (e.g., credit card limit increase for at least one corporate card); communicate a purchase order for raw materials or other supplies; other automated action in response to receiving the data; or some combination thereof. The client may determine a hiring plan for additional staff (e.g., part-time, seasonal, and/or permanent employees) based on the data. The client may determine operating and/or production hours for the business based on the data. The client may determine further cost-cutting or cost saving actions in line with the past cash flow and/or the cash flow forecast.

Figure 3C:
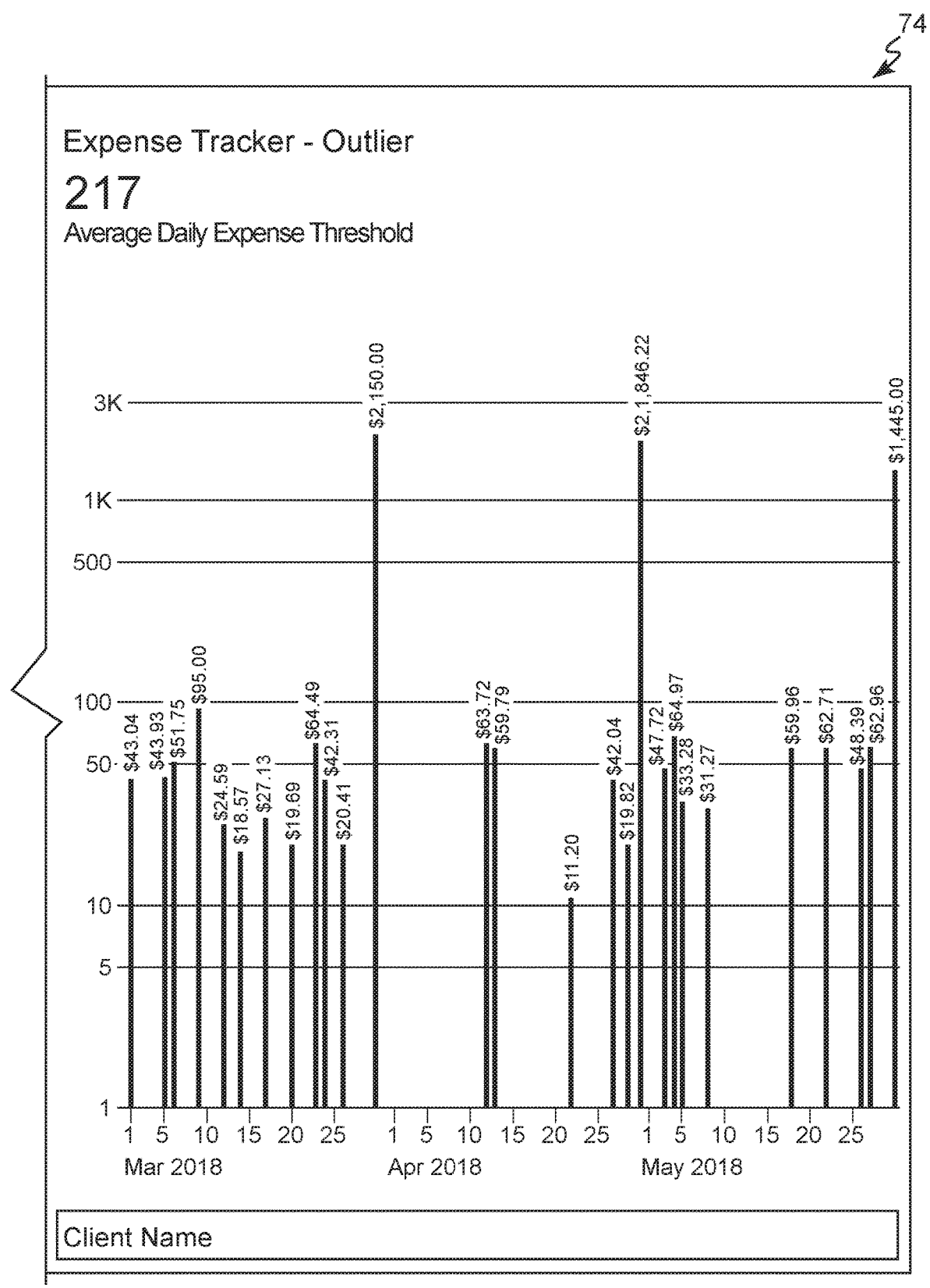

Referring to FIGS. 3A-3C, non-limiting embodiments or aspects of an expense report generated by the forecast generator 10 are shown. FIG. 3A shows an expense report 70 that shows the past expenses by the client for each account of the client and the amount spent by merchant category codes for each account. Such expense reports 70 may show the volume of expenses by account and the types of goods or services each account is used for. FIG. 3B shows a calendar view of an expense report 72 for the client for calendar year 2016, with the days of the calendar surrounded by a box corresponding to a day in which the client had at least one expense. A more granular view of each day's expenses can be obtained by selecting an individual boxed day. Such an expense report 72 may show any patterns to the monthly spending of the client, such as days of the month with increased expenses or months of the year with increased expenses. FIG. 3C shows an outlier tracker expense report 74, which includes a bar graph of total spending by day for March-May 2018. Spikes of daily spending (e.g., the $2,150.00, $2,1846.22, and $1,445.00) are distinguishable from the remaining days to alert the client of potential outlier daily spends. The expense reports 70, 72, 74 shown in FIGS. 3A-3C show past cash flow data.

Figure 4A:
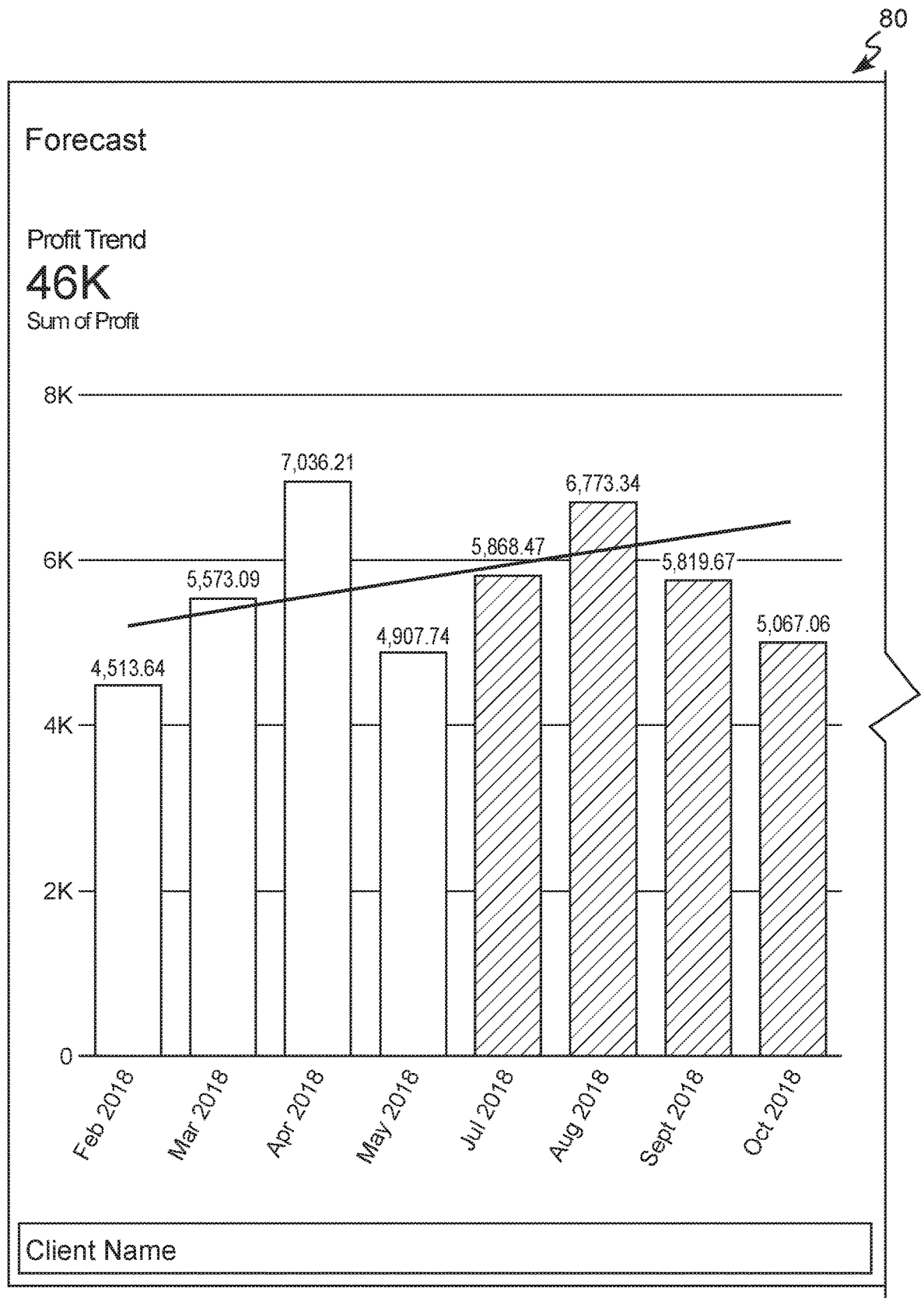
FIGS. 4A-4C show some non-limiting embodiments or aspects of cash flow forecasts generated by a forecast generator.
Figure 4B:
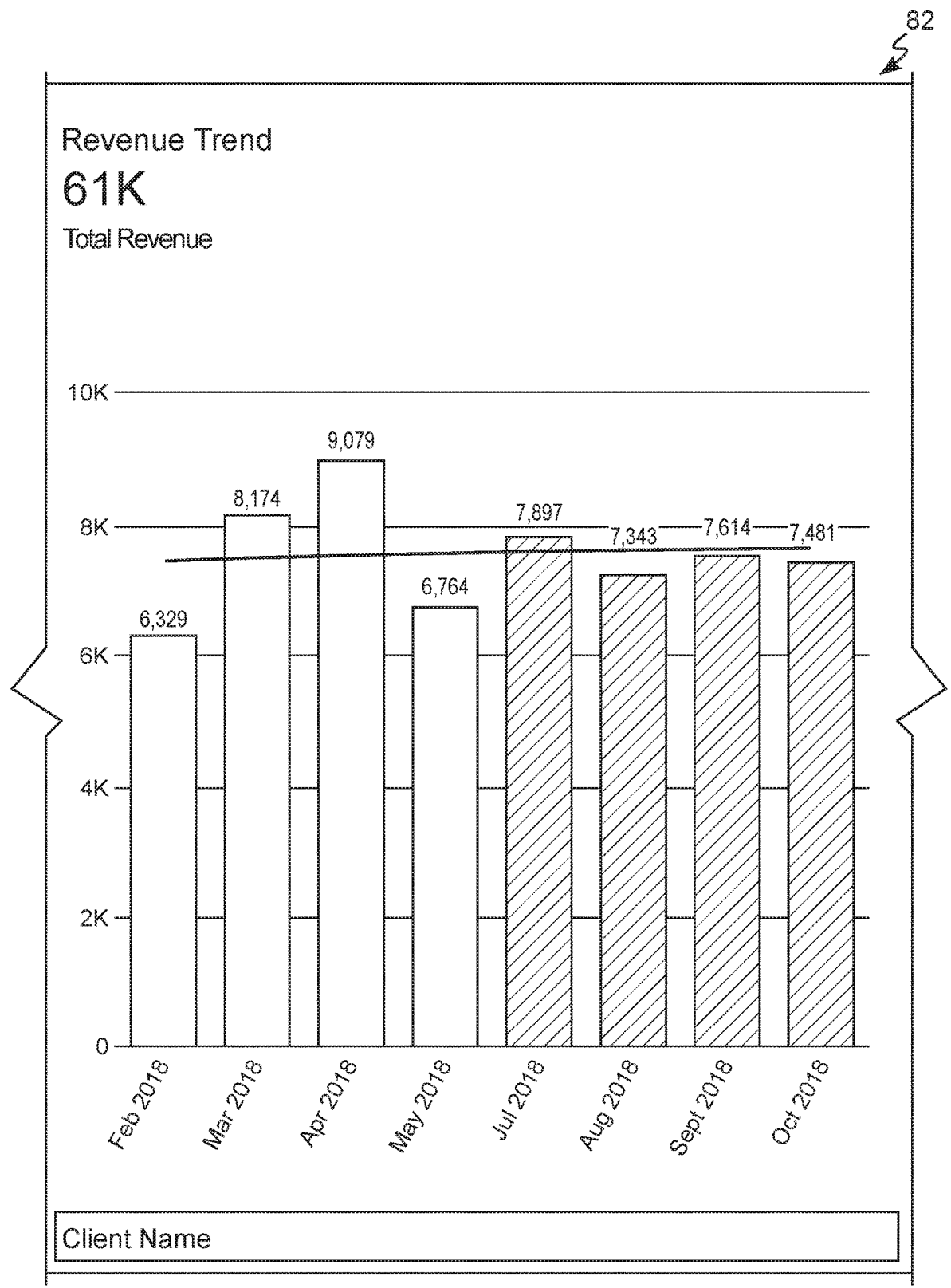
Figure 4C:
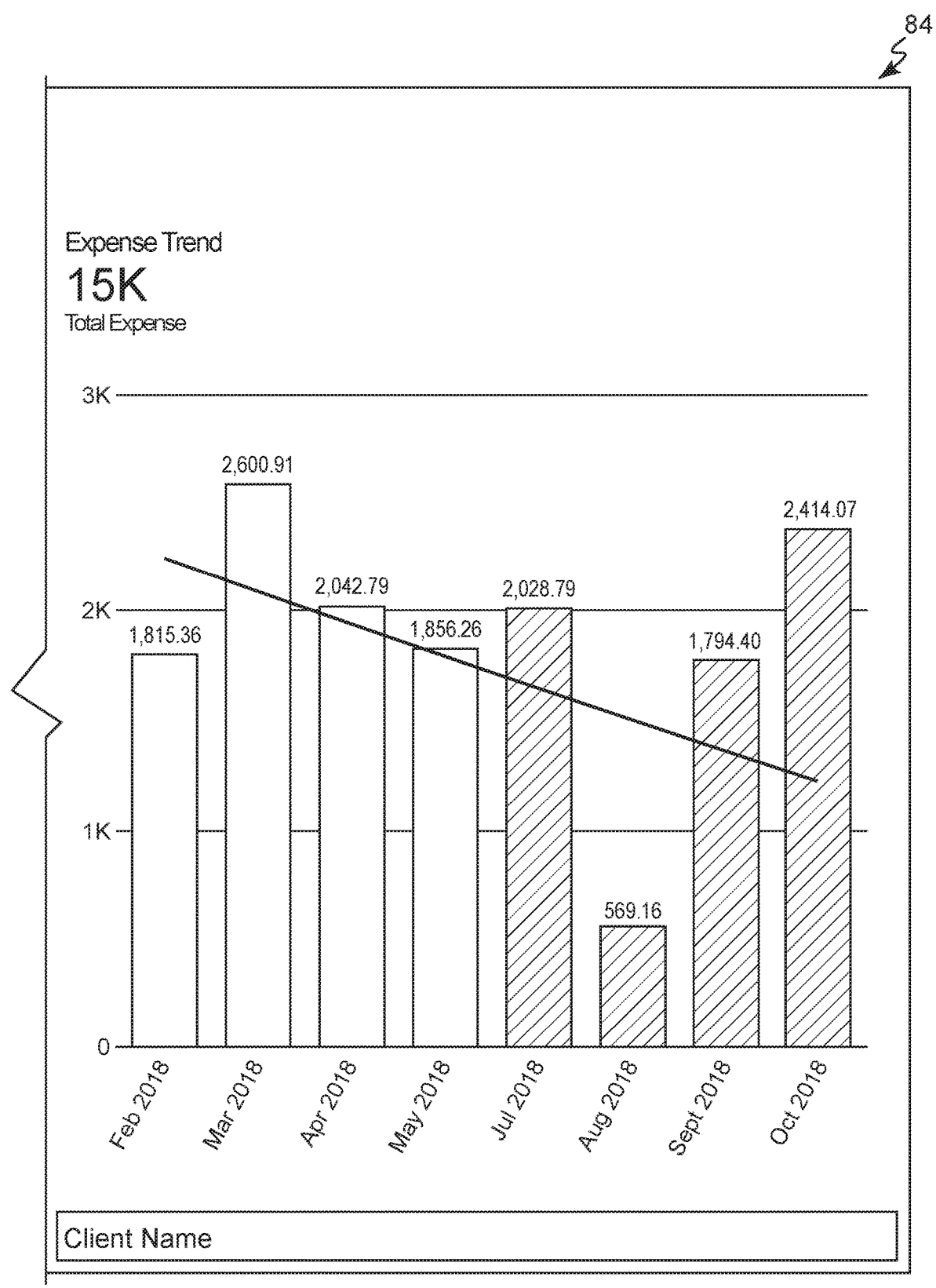

Referring to FIGS. 4A-4C, some non-limiting embodiments or aspects of cash flow forecasts generated by the forecast generator 10 are shown. The cash flow forecasts 80, 82, 84 in FIGS. 4A-4C include past cash flow components and cash flow forecast components. The past cash flow components are represented by the blank bars in the graph. The cash flow forecast components are represented by the shaded bars. The cash flow forecasts 80, 82, 84 in FIGS. 4A-4C further include a trendline fit to the past cash flow components and/or the cash flow forecast components. FIG. 4A shows a cash flow forecast 80 for profits of the client generated in June 2018 (May 2018 data is past cash flow data and July 2018 is forecasted cash flow data). FIG. 4B shows a cash flow forecast 82 for revenue of the client generated in June 2018. FIG. 4C shows a cash flow forecast 84 for expenses of the client generated in June 2018.

It will be appreciated that the user interfaces of the expense reports shown in FIGS. 3A-3C and the cash flow forecasts shown in FIGS. 4A-4C are exemplary, non-limiting user interfaces, and that the data may be presented to the client using any suitable user interface arrangement.

Figure 5:
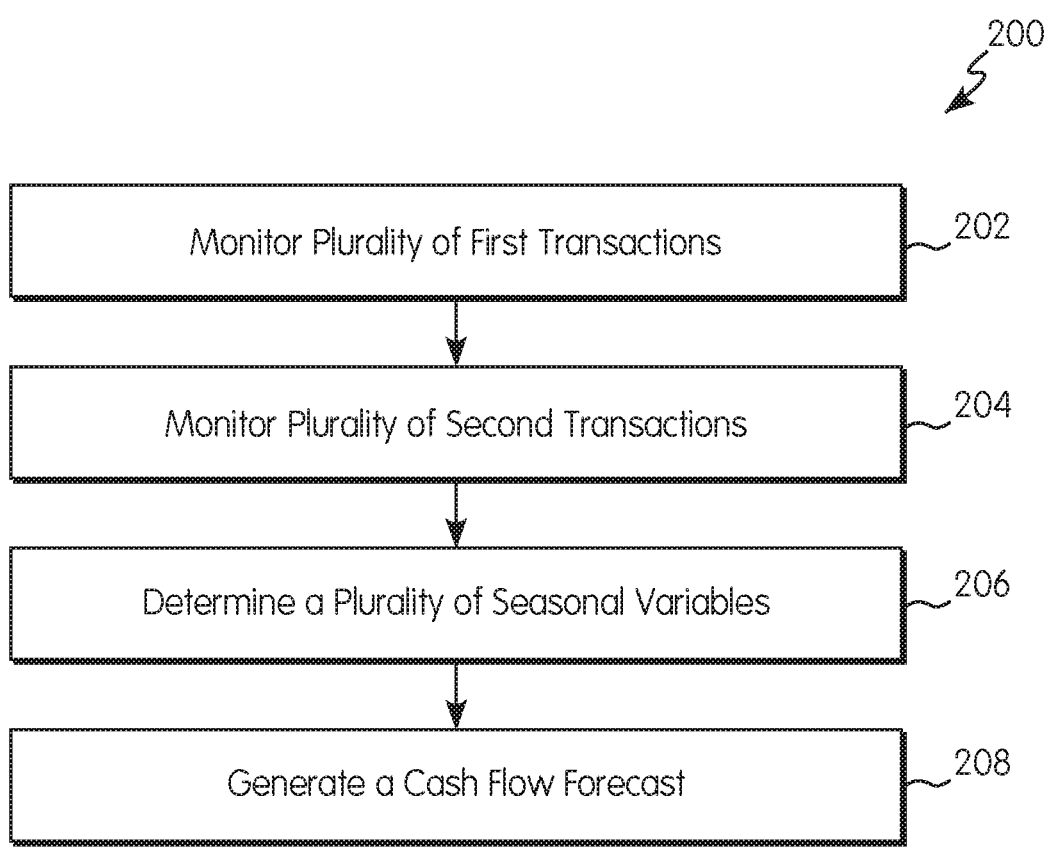
FIG. 5 shows a step diagram of a method for automated forecasting of cash flow according to some non-limiting embodiments or aspects.

Referring to FIG. 5, a method 200 for automated forecasting of cash flow is shown according to a non-limiting embodiment or aspect. At a first step 202, the forecast generator 10 (see FIG. 1) may monitor, while the payable payment transactions are being processed in the electronic payment processing network 20 (see FIGS. 1 and 2A), payable transaction data associated with the payable payment transactions, where the plurality of payable payment transactions are initiated with an account of the client merchant. At a second step 204 the forecast generator 10 may monitor, while the receivable payment transactions are being processed in the electronic payment processing network 20 (see FIGS. 1 and 2B), receivable transaction data associated with the receivable transactions, the receivable transactions between the client merchant and a plurality of users (consumers).

With continued reference to FIG. 5, at a third step 206, the forecast generator 10 may determine, based on the payable transaction data and the receivable transaction data, a plurality of seasonal variables. At a fourth step 208, the forecast generator 10 may generate a cash flow forecast associated with the client merchant, the cash flow forecast generated based on the plurality of seasonal variables. The generated cash flow forecasts may be communicated by the forecast generator 10 to the client device 50 (see FIG. 1).

In some non-limiting embodiments or aspects, a computer program product for automated forecasting of cash flow includes at least one non-transitory computer readable medium including program instructions that, when executed by at least one processor, cause the at least one processor to execute one of the previously-described systems and/or methods. The at least one processor may include the forecast generator 10.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A computer-implemented method for automated forecasting of cash flow, comprising:

monitoring, with at least one processor programmed to generate cash flow forecasts, while a plurality of first electronic payment transactions are being processed in an electronic payment processing network, payable transaction data associated with the plurality of first electronic payment transactions, the plurality of first electronic payment transactions initiated with at least one account issued to a merchant, wherein the electronic payment processing network is configured to process electronic payment transactions initiated using at least one payment device and comprises at least one merchant system, at least one transaction processing system, and at least one issuer system which issued the at least one payment device and which authorizes at least one of the electronic payment transactions, wherein the at least one processor is in communication with the electronic payment processing network to process each of the plurality of first electronic payment transactions during processing of each of the plurality of first electronic payment transactions;

monitoring, with the at least one processor while a plurality of second electronic payment transactions are being processed in the electronic payment processing network, receivable transaction data associated with the plurality of second electronic payment transactions, the plurality of second electronic payment transactions between the merchant and a plurality of users, wherein the at least one processor is in communication with the electronic payment processing network to process each of the plurality of second electronic payment transactions during processing of each of the plurality of second electronic payment transactions;

determining, with the at least one processor and based on the payable transaction data and the receivable transaction data, a plurality of seasonal variables;

generating, with the at least one processor, a cash flow forecast associated with the merchant, the cash flow forecast generated based on the plurality of seasonal variables, the payable transaction data, and the receivable transaction data, wherein the cash flow forecast is generated in near real-time relative to at least one payment transaction of the plurality of first electronic payment transactions and the plurality of second electronic payment transactions being received by the electronic payment processing network for processing;

in response to and during processing of a new electronic payment transaction in the electronic payment processing network, automatically generating, with the at least one processor, an updated cash flow forecast in near real-time relative to the new electronic payment transaction being received by the electronic payment processing network for processing, wherein the new electronic payment transaction is initiated with at least one account issued to the merchant or the new electronic payment transaction is initiated between the merchant and at least one account issued to a user, wherein the updated cash flow forecast is generated based on transaction data associated with the new electronic payment transaction, wherein the at least one processor is in communication with the electronic payment processing network to process the new electronic payment transaction during processing of the new electronic payment transaction; and in response to generating the updated cash flow forecast, automatically initiating, with the at least one processor, at least one of: generating and communicating a loan request for a loan, generating and communicating a request for a payment device limit increase, or generating and communicating a purchase order.

2. The computer-implemented method of claim 1, further comprising receiving, with the at least one processor, firmographics data associated with the merchant, wherein the cash flow forecast is generated based on the firmographics data.

3. The computer-implemented method of claim 1, wherein data associated with the plurality of seasonal variables is grouped into monthly sets.

4. The computer-implemented method of claim 1, further comprising determining, with the at least one processor and based on the payable transaction data and the receivable transaction data, a plurality of non-seasonal variables, wherein the cash flow forecast is generated based on the non-seasonal variables.

5. The computer-implemented method of claim 1, wherein the cash flow forecast comprises a cash flow forecast for at least a subsequent four months.

6. The computer-implemented method of claim 1, wherein the cash flow forecast is generated based on at least one of an exponential smoothing model and an autoregressive integrated moving average model.

7. A system for automated forecasting of cash flow, comprising at least one processor programmed to generate cash flow forecasts, the at least one processor programmed or configured to:

monitor, while a plurality of first electronic payment transactions are being processed in an electronic payment processing network, payable transaction data associated with the plurality of first electronic payment transactions, the plurality of first electronic payment transactions initiated with at least one account issued to a merchant, wherein the electronic payment processing network is configured to process electronic payment transactions initiated using at least one payment device and comprises at least one merchant system, at least one transaction processing system, and at least one issuer system which issued the at least one payment device and which authorizes at least one of the electronic payment transactions, wherein the at least one processor is in communication with the electronic payment processing network to process each of the plurality of first electronic payment transactions during processing of each of the plurality of first electronic payment transactions;

monitor, while a plurality of second electronic payment transactions are being processed in the electronic payment processing network, receivable transaction data associated with the plurality of second electronic payment transactions, the plurality of second electronic payment transactions between the merchant and a plurality of users, wherein the at least one processor is in communication with the electronic payment processing network to process each of the plurality of second electronic payment transactions during processing of each of the plurality of second electronic payment transactions;

determine, based on the payable transaction data and the receivable transaction data, a plurality of seasonal variables;

generate a cash flow forecast associated with the merchant, the cash flow forecast generated based on the plurality of seasonal variables, the payable transaction data, and the receivable transaction data, wherein the cash flow forecast is generated in near real-time relative to at least one payment transaction of the plurality of first electronic payment transactions and the plurality of second electronic payment transactions being received by the electronic payment processing network for processing;

in response to and during processing of a new electronic payment transaction in the electronic payment processing network, automatically generating, with the at least one processor, an updated cash flow forecast in near real-time relative to the new electronic payment transaction being received by the electronic payment processing network for processing, wherein the new electronic payment transaction is initiated with at least one account issued to the merchant or the new electronic payment transaction is initiated between the merchant and at least one account issued to a user, wherein the updated cash flow forecast is generated based on transaction data associated with the new electronic payment transaction, wherein the at least one processor is in communication with the electronic payment processing network to process the new electronic payment transaction during processing of the new electronic payment transaction; and in response to generating the updated cash flow forecast, automatically initiating, with the at least one processor, at least one of: generating and communicating a loan request for a loan, generating and communicating a request for a payment device limit increase, or generating and communicating a purchase order.

8. The system of claim 7, wherein the at least one processor is further programmed or configured to receive firmographics data associated with the merchant, wherein the cash flow forecast is generated based on the firmographics data.

9. The system of claim 7, wherein data associated with the plurality of seasonal variables is grouped into monthly sets.

10. The system of claim 7, wherein the at least one processor is further programmed or configured to determine, based on the payable transaction data and the receivable transaction data, a plurality of non-seasonal variables, wherein the cash flow forecast is generated based on the non-seasonal variables.

11. The system of claim 7, wherein the cash flow forecast comprises a cash flow forecast for at least a subsequent four months.

12. The system of claim 7, wherein the cash flow forecast is generated based on at least one of an exponential smoothing model and an autoregressive integrated moving average model.

13. A computer program product for automated forecasting of cash flow, the computer program product comprising at least one non-transitory computer-readable medium including one or more instructions that, when executed by at least one processor programmed to generate cash flow forecasts, cause the at least one processor to:

monitor, while a plurality of first electronic payment transactions are being processed in an electronic payment processing network, payable transaction data associated with the plurality of first electronic payment transactions, the plurality of first electronic payment transactions initiated with at least one account issued to a merchant, wherein the electronic payment processing network is configured to process electronic payment transactions initiated using at least one payment device and comprises at least one merchant system, at least one transaction processing system, and at least one issuer system which issued the at least one payment device and which authorizes at least one of the electronic payment transactions, wherein the at least one processor is in communication with the electronic payment processing network to process each of the plurality of first electronic payment transactions during processing of each of the plurality of first electronic payment transactions;

monitor, while a plurality of second electronic payment transactions are being processed in the electronic payment processing network, receivable transaction data associated with the plurality of second electronic payment transactions, the plurality of second electronic payment transactions between the merchant and a plurality of users, wherein the at least one processor is in communication with the electronic payment processing network to process each of the plurality of second electronic payment transactions during processing of each of the plurality of second electronic payment transactions;

determine, based on the payable transaction data and the receivable transaction data, a plurality of seasonal variables;

generate a cash flow forecast associated with the merchant, the cash flow forecast generated based on the plurality of seasonal variables, the payable transaction data, and the receivable transaction data, wherein the cash flow forecast is generated in near real-time relative to at least one payment transaction of the plurality of first electronic payment transactions and the plurality of second electronic payment transactions being received by the electronic payment processing network for processing;

in response to and during processing of a new electronic payment transaction in the electronic payment processing network, automatically generating, with the at least one processor, an updated cash flow forecast in near real-time relative to the new electronic payment transaction being received by the electronic payment processing network for processing, wherein the new electronic payment transaction is initiated with at least one account issued to the merchant or the new electronic payment transaction is initiated between the merchant and at least one account issued to a user, wherein the updated cash flow forecast is generated based on transaction data associated with the new electronic payment transaction, wherein the at least one processor is in communication with the electronic payment processing network to process the new electronic payment transaction during processing of the new electronic payment transaction; and in response to generating the updated cash flow forecast, automatically initiating, with the at least one processor, at least one of: generating and communicating a loan request for a loan, generating and communicating a request for a payment device limit increase, or generating and communicating a purchase order.

14. The computer program product of claim 13, wherein the one or more instructions cause the at least one processor to receive firmographics data associated with the merchant, wherein the cash flow forecast is generated based on the firmographics data.

15. The computer program product of claim 13, wherein data associated with the plurality of seasonal variables is grouped into monthly sets.

16. The computer program product of claim 13, wherein the one or more instructions cause the at least one processor to determine, based on the payable transaction data and the receivable transaction data, a plurality of non-seasonal variables, wherein the cash flow forecast is generated based on the non-seasonal variables.

17. The computer program product of claim 13, wherein the cash flow forecast comprises a cash flow forecast for at least a subsequent four months.

18. The computer program product of claim 13, wherein the cash flow forecast is generated based on at least one of an exponential smoothing model and an autoregressive integrated moving average model.

\* \* \* \* \*